United States Patent
Boss et al.

(10) Patent No.: US 10,274,338 B2
(45) Date of Patent: Apr. 30, 2019

(54) RISK SITUATIONS FOR VEHICLE OCCUPANTS BASED ON DATA PROVIDED BY VEHICLE SENSORS AND CONTEXTUAL INFORMATION

(71) Applicant: International Business Machines Corporation, Armonk, NY (US)

(72) Inventors: Gregory J. Boss, Saginaw, MI (US); Ivonne R. Cuervo, Heredia (CR); Maria E. Hasbun Pacheco, Alajuela (CR); Andrea Macias Garcia, Escazu (CR); Blanca R. Navarro Piedra, Heredia (CR); Edgar A. Zamora Duran, Santo Domingo (CR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

(21) Appl. No.: 15/375,136

(22) Filed: Dec. 11, 2016

(65) Prior Publication Data
US 2018/0162307 A1 Jun. 14, 2018

(51) Int. Cl.
*G08G 1/16* (2006.01)
*G07C 5/08* (2006.01)
(Continued)

(52) U.S. Cl.
CPC ........ *G01C 21/3691* (2013.01); *B60R 21/013* (2013.01); *G05B 23/00* (2013.01);
(Continued)

(58) Field of Classification Search
CPC .................. B60R 21/01; B60R 21/013; B60R 2021/01013; B60R 2021/01286;
(Continued)

(56) References Cited

U.S. PATENT DOCUMENTS 6,335,689 B1  1/2002  Mine
6,925,425 B2  8/2005  Remboski et al.
(Continued)

FOREIGN PATENT DOCUMENTS

WO  2011063269 A1  5/2011
WO  2014016620 A1  1/2014

OTHER PUBLICATIONS

Shonali Krishnaswamy et al., "Towards Situation-Awareness and Ubiquitous Data Mining for Road Safety: Rationale and Architecture for a Compelling Application", Centre for Accident Road Research and Safety Queensland, Queensland University of Technology, Feb. 16-17, 2005.
(Continued)

*Primary Examiner* — Rodney A Butler
(74) *Attorney, Agent, or Firm* — Law Offices of Ira D. Becker, P.C.

(57) ABSTRACT

A method for improving risk situations for vehicle occupants in a vehicle which includes: configuring a set of circumstances; defining a set of values for each circumstance where each value has a rate; collecting context information for the circumstances, values and rates; collecting real-time sensor measurements pertaining to a vehicle, a driver and vehicle occupants; retrieving risk patterns from a risk pattern database; matching the sensor measurements to the risk patterns to find a matching risk pattern having a risk similarity value; contextualizing the matching risk pattern by increasing the risk similarity value to result in a personalized risk value; comparing the personalized risk value to a threshold; and executing a context modifying action to lower the personalized risk value below a predefined threshold when the personalized risk value exceeds the predefined threshold.

20 Claims, 2 Drawing Sheets

(51) Int. Cl.
*G05B 23/00* (2006.01)
*G01C 21/36* (2006.01)
*B60R 21/013* (2006.01)
*G06N 99/00* (2019.01)
*B60R 21/01* (2006.01)

(52) U.S. Cl.
CPC ............. *G07C 5/08* (2013.01); *G07C 5/0816* (2013.01); *G08G 1/16* (2013.01); *B60R 2021/01013* (2013.01); *B60R 2021/01286* (2013.01); *G01C 21/3697* (2013.01); *G06N 99/005* (2013.01)

(58) Field of Classification Search
CPC ............ G01C 21/3691; G01C 21/3461; G01C 21/3697; G06N 99/005; G06N 5/047; G07C 5/08; G07C 5/0816; G08G 1/16; G05B 23/00
See application file for complete search history.

(56) References Cited

U.S. PATENT DOCUMENTS

| | | | |
|---|---|---|---|
| 7,592,920 B2 | 9/2009 | Kopf et al. | |
| 8,508,351 B2 | 8/2013 | Roelke et al. | |
| 8,508,353 B2 | 8/2013 | Cook et al. | |
| 8,554,468 B1 | 10/2013 | Bullock | |
| 8,849,501 B2 | 9/2014 | Cook et al. | |
| 8,892,451 B2* | 11/2014 | Everett | G06Q 40/08 705/4 |
| 9,047,170 B2 | 6/2015 | Naboulsi | |
| 9,791,864 B2* | 10/2017 | Lei | G05D 1/0214 |
| 2005/0174217 A1* | 8/2005 | Basir | G07C 5/008 340/425.5 |
| 2011/0077028 A1 | 3/2011 | Wilkes, III et al. | |
| 2014/0240114 A1 | 8/2014 | Waeller et al. | |
| 2014/0375810 A1 | 12/2014 | Rodriguez | |
| 2015/0025917 A1* | 1/2015 | Stempora | G06Q 40/08 705/4 |
| 2015/0325121 A1* | 11/2015 | Konigsberg | G08G 1/0962 340/459 |
| 2017/0057411 A1* | 3/2017 | Heath | B60W 50/0097 |
| 2017/0076395 A1* | 3/2017 | Sedlik | G08G 1/0112 |
| 2017/0089710 A1* | 3/2017 | Slusar | B60R 1/00 |

OTHER PUBLICATIONS

Don Remboski et al., "Driver Performance Improvement Through the Driver Advocate: A Research Initiative Toward Automotive Safety", Society of Automotive Engineers, Inc., 2000.
Elizabeth Rendon-Velez et al., "Progress With Situation Assessment and Risk Prediction in Advanced Driver Assistance Systems: A Survey", Dec. 31, 2009.
Jonathan Maus, "Google says self-driving car can predict gestures, movements of bike riders", [online], [retrieved on Apr. 14, 2016]. Retrieved from the Internet <URL: http://bikeportland.org/2014/04/28/google-says-self-driving-car-can-predict-gestures-movement-of-bike-riders-105201>.
Jim Motavalli, "Mercedes Benz showcases technology that can predict -and avoid -crashes", [online], [retrieved on Apr. 14, 2016]. Retrieved from the Internet <URL: http://www.mnn.com/green-tech/transportation/blogs/mercedes-benz-showcases-technology-that-can-predict-and-avoid-crashe>.
"Smart Cars Predict Emergencies and Make Drivers Safer", [online], [retrieved on Apr. 14, 2016]. Retrieved from the Internet <URL: http://www.streetdirectory.com/travel_guide/215375/cars/smart_cars_predict_emergencies_and_make_drivers_safer.html>.

* cited by examiner

RISK SITUATIONS FOR VEHICLE OCCUPANTS BASED ON DATA PROVIDED BY VEHICLE SENSORS AND CONTEXTUAL INFORMATION

BACKGROUND

The present exemplary embodiments pertain to preventing risk situations pertaining to vehicles and, more particularly, using analytics based on vehicle sensors and contextual information to prevent the risk situations pertaining to vehicles.

Vehicle accidents are costly in terms of vehicle damage and injury to occupants of the vehicles. Various solutions have been proposed to improve vehicle safety including vehicle sensors which monitor the operation of the vehicle. These solutions typically look at past events and report back to the driver with the results of the operation of the vehicle.

There does not appear to be an effort to provide ongoing feedback to the driver in order for the driver to improve his/her driving operation.

BRIEF SUMMARY

The various advantages and purposes of the exemplary embodiments as described above and hereafter are achieved by providing, according to an aspect of the exemplary embodiments, a computer-implemented method for improving risk situations for vehicle occupants in a vehicle comprising; configuring a set of circumstance where each circumstances is a condition of a time, a place or a manner that accompanies or influences an event or a person; defining a set of values for each circumstance where each value has a rate; collecting context information for the circumstances, values and rates; collecting by vehicle sensors, real-time sensor measurements pertaining to a vehicle, a driver and vehicle occupants; retrieving risk patterns from a risk pattern database; matching the sensor measurements to the risk patterns to find a matching risk pattern having a risk similarity value; contextualizing the matching risk pattern by increasing the risk similarity value to result in a personalized risk value; comparing the personalized risk value to a threshold; and executing a context modifying action to lower the personalized risk value when the personalized risk value exceeds a predefined threshold wherein the context modifying action is a personalized action with respect to the vehicle occupants or the vehicle that decreases the personalized risk value below the predefined threshold.

According to another aspect of the exemplary embodiments, there is provided a system for improving risk situations for vehicle occupants in a vehicle comprising; a computer readable storage medium that stores instructions; and a processor that executes the instructions to perform the following functions: configure a set of circumstances where each circumstance is a condition of a time, a place or a manner that accompanies or influences an event or a person; define a set of values for each circumstance where each value has a rate; collect context information for the circumstances, values and rates; collect by vehicle sensors, real-time sensor measurements pertaining to a vehicle, a driver and vehicle occupants; retrieve risk patterns from a risk pattern database; match the sensor measurements to the risk patterns to find a matching risk pattern having a risk similarity value; contextualize the matching risk pattern by increasing the risk similarity value to result in a personalized risk value; compare the personalized risk value to a threshold; and execute a context modifying action to lower the personalized risk value when the personalized risk value exceeds a predefined threshold wherein the context modifying action is a personalized action with respect to the vehicle occupants or the vehicle that decreases the personalized risk value below the predefined threshold.

According to a further aspect of the exemplary embodiments, there is provided a computer program product for improving risk situations for vehicle occupants in a vehicle, the computer program product comprising a computer readable storage having program instructions embodied therewith, the program instructions executable by a processor to cause the processor to perform a method comprising; configuring a set of circumstances where each circumstances is a condition of a time, a place or a manner that accompanies or influences an event or a person; defining a set of values for each circumstance where each value has a rate; collecting context information for the circumstances, values and rates; collecting by vehicle sensors, real-time sensor measurements pertaining to a vehicle, a driver and vehicle occupants; retrieving risk patterns from a risk pattern database; matching the sensor measurements to the risk patterns to find a matching risk pattern having a risk similarity value; contextualizing the matching risk pattern by increasing the risk similarity value to result in a personalized risk value; comparing the personalized risk value to a threshold; and executing a context modifying action to lower the personalized risk value when the personalized risk value exceeds a predefined threshold wherein the context modifying action is a personalized action with respect to the vehicle occupants or the vehicle that decreases the personalized risk value below the predefined threshold.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

The present inventors have observed that vehicle incidents may be preceded by a series of conditions that are worsened by the context in which these are occurring. For example, a stressed driver may be more likely to drive erratically and thus more likely to be in a vehicle accident. The exemplary embodiments propose to understand these conditions and, in a personalized way, modify the context to decrease the risks and allow the driver to take action.

The exemplary embodiments employ the personalization of evaluation of risk and the selection of an action to take. The exemplary embodiments have the ability to transform real time data from different datasources into a personalized and contextualized risk evaluation and a personalized action control over the vehicle to decrease the risk probability.

There is proposed a solution that allows to diagnose risk situations and prevent them by obtaining and analyzing several consecutive "snapshots" of the passengers, including the driver, and vehicle status data, contextualized in the environment in which this data is being generated, and learning from its changes.

Contextual means a set of circumstances or facts that surrounds a particular event. In terms of the exemplary embodiments, contextual may include environmental data such as weather, route, temperature, time and personalized context data including data obtained from a driver profile and data from the vehicle occupants' social networks and gestures recognition. Contextualize is understood to mean data or an action that is put into context.

A "risk" is a potential loss of "value". The evaluation of risk is based on the comparison between current information being processed and previous experience, which set a limit for an alarm status. Context helps to better understand the current data because it explains the conditions in which a risk is increased. The context is defined by a variable set of circumstances, which may have several possible values.

The exemplary embodiments are an automated centralized system that will learn from the driver and passengers experiences and behaviors, and based on those experiences and behaviors will evaluate data samples obtained by the vehicle sensors against risk patterns to prevent or mitigate a risk situation, and preferably execute an automatic context modifying action. For example, to drive at high speed at night with rain represents a risk (vision problem), and if the driver is identified to be stressed, then the risk probability is higher. As an action to decrease the probability of a risk to occur for this particular driver given this specific context (high speed, rain, driver stressed), the system could turn on the radio for him/her to relax and then limit the car speed, instead of showing an alert which could stress him/her even more.

The vehicle and context data, but not including personal context data, will be transformed into a stream, and compared against known risk patterns. This will give a risk similarity value.

A risk similarity score is a numeric value that identifies how similar is the context and environmental data stream (gathered from vehicle sensors or information services (i.e. weather)) to the existing known risk patterns.

EXAMPLE 1

Take the example of a person left alone in a vehicle:
A.1 Sensors' Data log. The sensors log has nine entries:

| # | Timestamp | Motion | Passengers | Weight | Belts | Movement | Temp | AirQuality |
|---|---|---|---|---|---|---|---|---|
| 1 | 2014-08-27 13:15:04 | Yes | [1, 1, 1, 0, 1] | [80, 58, 4, 0, 10] | [1, 1, 0, 0, 0] | [5, 2, 5, 0, 0] | 23 | 2 |
| 2 | 2014-08-27 13:20:14 | Yes | [1, 1, 1, 0, 1] | [80, 58, 4, 0, 10] | [1, 1, 0, 0, 0] | [5, 2, 6, 0, 0] | 23 | 2 |
| 3 | 2014-08-27 13:25:24 | Yes | [1, 1, 1, 0, 1] | [80, 58, 4, 0, 10] | [1, 1, 0, 0, 0] | [5, 2, 7, 0, 0] | 23 | 2 |
| 4 | 2014-08-27 13:30:34 | Yes | [1, 1, 0, 0, 1] | [80, 58, 0, 0, 10] | [1, 1, 0, 0, 0] | [5, 2, 8, 0, 0] | 23 | 2 |
| 5 | 2014-08-27 13:35:44 | No | [0, 0, 1, 0, 1] | [0, 0, 4, 0, 10] | [0, 0, 1, 0, 0] | [0, 0, 2, 0, 0] | 23 | 3 |
| 6 | 2014-08-27 13:40:54 | No | [0, 0, 1, 0, 1] | [0, 0, 4, 0, 10] | [0, 0, 1, 0, 0] | [0, 0, 2, 0, 0] | 24 | 4 |
| 7 | 2014-08-27 13:45:04 | No | [0, 0, 1, 0, 1] | [0, 0, 4, 0, 10] | [0, 0, 1, 0, 0] | [0, 0, 2, 0, 0] | 25 | 5 |
| 8 | 2014-08-27 13:50:14 | No | [0, 0, 1, 0, 1] | [0, 0, 4, 0, 10] | [0, 0, 1, 0, 0] | [0, 0, 2, 0, 0] | 26 | 6 |
| 9 | 2014-08-27 13:55:24 | No | [0, 0, 1, 0, 1] | [0, 0, 4, 0, 10] | [0, 0, 1, 0, 0] | [0, 0, 1, 0, 0] | 27 | 7 |

Data characteristics in the sensors' data log:
  Assume a common vehicle of 5 seats represented as an array [driver, passenger1, passenger2, passenger3, passenger4]
  Motion: the car is in motion Yes or No
  For Passengers sensor, 1=occupied.
  Weight is in Kg.
  For seat belts sensor, 1=fastened.
  For movement, a scale is proposed where 10 is a lot of movement and 0 is no movement.
  Temperature is in Celsius degrees.
  Air Quality: index from 1 to 10 where 1-3=Low risk, 4-6=Moderate risk, 7-10=High risk.

A.2 In the risk pattern database, there are several risks, one of them is "Person left alone within vehicle". This risk has:
  Required sensors list: Motion, Passengers, Movement, Temp, AirQuality
  Actions: (a) Open window 1 cm and (b) Send SMS alert to 8899-7766.
  Patterns: To determine a risk situation in which a person was left alone within a vehicle five samples are required. Each sample has its pattern that contains a text specification of a regular expression that is equivalent to:
  1. Motion="No", Passengers="At least one passenger" and Movement>=1 in any seat position, Temp>=23, 1<AirQuality=<3.
  2. Motion="No", Passengers="At least one passenger" and Movement>=1 in any seat position, Temp>=23, 1<AirQuality=<3.
  3. Motion="No", Passengers="At least one passenger" and Movement>=1 in any seat position, Temp>=25, 3<AirQuality=<6.
  4. Motion="No", Passengers="At least one passenger" and Movement>=1 in any seat position, Temp>=25, 3<AirQuality=<6.
  5. Motion="No", Passengers="At least one passenger" and Movement>=1 in any seat position, Temp>=25, 6<AirQuality.

A.3 The last five rows of reduced data set to analyze for this risk, according to the required sensors, would be:

| Motion | Passengers | Movement | Temp | AirQuality |
|---|---|---|---|---|
| No | [0, 0, 1, 0, 1] | [0, 0, 2, 0, 0] | 23 | 3 |
| No | [0, 0, 1, 0, 1] | [0, 0, 2, 0, 0] | 24 | 4 |
| No | [0, 0, 1, 0, 1] | [0, 0, 2, 0, 0] | 25 | 5 |
| No | [0, 0, 1, 0, 1] | [0, 0, 2, 0, 0] | 26 | 6 |
| No | [0, 0, 1, 0, 1] | [0, 0, 1, 0, 0] | 27 | 7 |

A.4 Diagnosis: The sample evaluation:
Motion Passengers Movement Temp AirQuality
No [0,0,1,0,1] [0,0,2,0,0] 23 3
>>Matches first pattern? R/Yes. Motion="No", Passengers="1" and Movement>1 in passenger3 seat and Temp 23>=23 and AirQuality 1<3<=3.
No [0,0,1,0,1] [0,0,2,0,0] 24 4
>>Matches second pattern? R/Yes. Motion="No", Passengers="1" and Movement>1 in passenger3 seat and Temp 24>=23 and AirQuality 1<4<=3.

No [0,0,1,0,1] [0,0,2,0,0] 25 5
>>Matches third pattern? R/Yes. Motion="No", Passengers="1" and Movement>1 in passenger3 seat and Temp 25>=25 and AirQuality 3<5<=6.
No [0,0,1,0,1] [0,0,2,0,0] 26 6
>>Matches fourth pattern? R/Yes. Motion="No", Passengers="1" and Movement>1 in passenger3 seat and Temp 26>=25 and AirQuality 3<6<=6 No [0,0,1,0,1] [0,0,1,0,0] 27 7
>>Matches fifth pattern? R/Yes. Motion="No", Passengers="1" and Movement>1 in passenger3 seat and Temp 27>=25 and AirQuality 6<7.
A.4 Risk behavior detected. All risk patterns match its corresponding sensor data row, so system-suggested context modifying action is emitted: (a) Open window 1 cm and (b) Send SMS alert to 8899-7766.

In this example of a person left alone in a vehicle, the risk similarity value is 100% because the data stream completely matches the risk pattern. In other risk situations, the risk similarity value may be and usually will be less.

This risk similarity value may be increased, but not above 100%, by the current stored values related to the specific personalized data. That is, the risk similarity value may be increased by the personal context data to result in a personalized risk value.

For example, a specific driver, being stressed represents an increase of 25% to materialize a risk. The 25% is assumed here based on historical information in the risk patterns database wherein a stressed driver is associated with a particular risk. This percentage may be before training, after which it may be adjusted.

EXAMPLE 2

To drive at high speed at night with rain represents a risk (vision problem) and has a risk similarity value of 60%. If the driver is identified to be stressed, then the risk probability is higher. The personal context increases the risk by 25%. Then, the risk similarity value of 60% is increased by 25% to result in a 75% personalized risk value.

This will result in a definitive personalized risk value that will be compared to a threshold. There is a threshold set for each specific risk matched to a risk pattern. The threshold identifies the limit at which a personalized action will be triggered. In Example 2, the threshold may be 70%.

If the threshold is reached, the personalized analysis will be transformed into an automatic context modifying action such as a set of controls in the car, which may autonomously take over and execute the action that best suits the driver. For example: setting speeding limits, sending alerts, opening windows, activating the alarm, cooling/warming the car, stopping the car if reckless driving is detected.

Another important process of the exemplary embodiments is the training process, which is intended to adjust the risk evaluation and the automatic context modifying action selection.

For the risk evaluation, the system checks the risk similarity value to see if it converges towards the threshold faster than the personalized risk value. If this is the case, the personalized factors are checked, and new ones related to the known risks or current values adjusted.

For automatic context modifying action selection, the system evaluates which of the context modifying actions being executed makes the personalized risk value diverge faster from the threshold. If the personalized risk value diverges faster from the threshold, then one or more automatic context modifying actions of known risks may be applied.

For the training process, initially for each risk there is a set of context modifying actions to decrease the risk similarity value, or decrease the personal risk value. However these context modifying actions have a general configuration. The training will personalize these context modifying actions, for the specific driver, to promote those context modifying actions that make the personal risk value, for each identified risk, to decrease to the minimum possible and as soon as possible.

Returning to Example 2, the personalized risk value was 75%. The threshold for this risk is 70%, so since the personalized risk value is higher than the threshold, an action has to be taken. Initially, in the training process, this risk may indicate two context modifying actions. One context modifying action may be to turn on the radio with learned driver preferences for soft music. A second context modifying action may be to show an alert.

When the system applies the first context modifying action, the personalized risk value may decrease to 50% in 4 minutes (diverges away from the threshold). When the system applies the second context modifying action, the personalized risk value stays at 75%. The system learns that the first context modifying action has a greater positive effect on preventing the risk.

Figure 1:
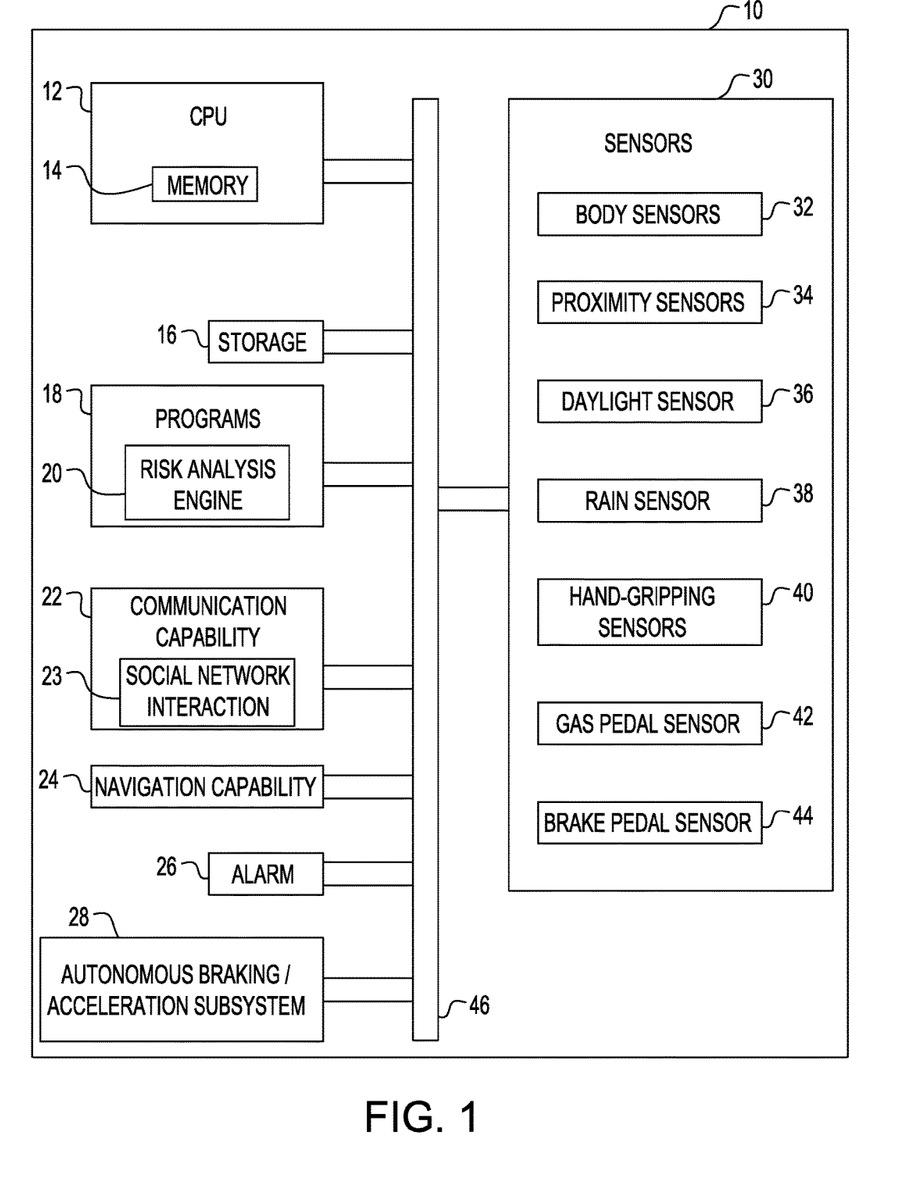
FIG. 1 depicts an apparatus of the exemplary embodiments having a risk analysis engine.

The exemplary embodiments may be embodied in a risk analysis engine in an apparatus 10 illustrated in FIG. 1. The apparatus 10 may be present in the vehicle (not shown) to perform the function of the risk analysis engine and other functions.

The apparatus 10 may include a central processing unit 12 having memory 14. Storage 16 such as a flash drive or hard drive may also be present in apparatus 10 although it is within the scope of the exemplary embodiments to have the storage 16 remote from the apparatus 10 and connected by a network of some sort to the apparatus 10. The apparatus 10 may further include programs 18 having executable code for implementing the methods of the exemplary embodiments. One such program may be the risk analysis engine 20.

Apparatus 10 may have a communication capability 22 to interactively communicate with the vehicle or persons/entities external to the vehicle including remote databases. The communication capability 22 may use any wireless communication technology including but not limited to cellular, satellite, radio, Bluetooth short range radio and WiFi. In particular, the communication capability 22 may be used for social network interaction 23 to learn information about the driver or the other vehicle occupants.

Also included within apparatus 10 may be navigation capability such as a GPS system to keep track of the vehicle's location and the vehicle's proximity to events and obstacles that may affect the risks encountered by the vehicle.

Apparatus 10 may further include an alarm 26 for indicating by the risk analysis engine 20 to the driver of the vehicle that a collision with another vehicle or object is imminent and the driver of the vehicle should take a corrective action such as immediately applying the brakes or swerving off the road in a safe manner to avoid the collision.

An autonomous braking/acceleration subsystem 28 may be present in the apparatus 10 and in communication with the risk analysis engine 20 to take a corrective action such as immediately autonomously (i.e., without driver input) applying the brakes or accelerating in the case of driver inattention or some other event. The autonomous braking and acceleration subsystem 28 is in addition to the manually-applied braking and acceleration systems that are present in a normal vehicle.

Also included within apparatus 10 may be various sensors 30 that may sense or determine various parameters with respect to the driver and/or the vehicle.

One sensor may be a body sensor 32 that may, for example, measure the pulse and respiration of the driver.

Other sensors may include proximity sensors 34 to indicate proximity to nearby vehicles, persons or obstacles.

Another sensor may be a daylight sensor 36 to sense the amount of ambient light and register whether it is daytime or nighttime or any time in between.

The sensors 30 may further include a rain sensor 38 to register whether it is raining or not which can have an effect on the road surface.

There may also be hand-gripping sensors 40 on the steering wheel to register how tightly or loosely the driver is holding the steering wheel. If the hand-gripping sensors register that the driver is barely holding the steering wheel or even loses his grip of the steering wheel, this may indicate that the driver has lost consciousness.

Finally, there may be a gas pedal sensor 42 and a brake pedal sensor 44 to sense the driver's pressure on the vehicle's gas pedal and brake pedal, respectively.

All the components in the apparatus 10 may be connected by a bus 46.

The training process for the risk analysis engine 20 will now be discussed in more detail.

The initial setup is the predefined set of risk, context and rates data for a vehicle. These rates identify how much a circumstance value affects the materialization of a risk. In the training period, the system has to learn how much the specific driver is affected by the driver's mood (for example, stress, tiresome, sleepiness) in each of the system known risks. Next is part of an initial setup where percentages in the circumstance values are the rates.

EXAMPLE 3

Risk1: Car crash for high speed
RiskPattern1forRisk1: [speed 100+KM/h]
RiskContext1forRisk1:
{Circumstance: driver mood [tired:50%, sleepy:50%, stressed:50%]}
{Circumstance: weather [rainy:50%, sunny:50%, foggy: 50%]}

In this example, the driver mood, in the initial setup, is approximately 50% affected by being tired, sleepy or stressed.

It can be defined like this: There is a default basic context. The context is defined by a configurable set of circumstances, every one with a set of values. For example, a circumstance "Driver Mood" may have values "Happy", "Sleepy", "Tired", "Angry", etc. There is also a default set of patterns for readouts of the sensors 30 that represent risks.

A circumstance is a condition of a time, a place or a manner that accompanies or influences an event or person. Some circumstances, for the purpose of illustration and not limitation, may include driver mood, weather, driver age, driver health, time of day, location, route, etc.

The context data has associations with the risk, for example, the circumstance "Mood" with value "Sleepy" is associated with the risk pattern for "Car crash". The circumstance "mood" plus the value "sleepy" is the context data. This association is basically a circumstance rate that identifies how a specific circumstance increases a risk. Each risk has a set of automatic context modifying actions attached.

Returning to Example 3:
Risk1: Car crash for high speed
RiskPattern1forRisk1: [speed 100+KM/h]
RiskContext1forRisk1:
{Circumstance: driver mood [tired:50%, sleepy:50%, stressed:50%]}
{Circumstance: weather [rainy:50%, sunny:50%, foggy: 50%]}

This is an initial setup that has to be personalized to the driver. After training this example 3 could be as follows:
Risk1: Car crash for high speed
RiskPattern1forRisk1: [speed 100+KM/h]
RiskContext1forRisk1:
{Circumstance: driver mood [tired:60%, sleepy:0%, stressed:75%]}
{Circumstance: weather [rainy:75%, sunny:0%, foggy: 20%]}

The personalized risk is that the driver is at risk of crashing for high speed when driving at 100+KM/h. However, the driver is especially at risk crashing for high speed when driving stressed or tired in the rain. For other drivers, these circumstance rates (i.e., the percentages in the circumstances values) may vary.

There are two kind of context modifying actions: i) Reporting, like email and configured by user, and ii) context modifiers, which change environmental variables, like radio volume or open windows, to change context to minimize risk.

During the training process, the risk analysis engine 20 basically adjusts these circumstance rates. This adjustment process is as follows:

In a first step, the vehicle collects circumstances values. For example, the vehicle checks if a value for the circumstance "driver mood exists (i.e., the driver shows signs of stress, angry, tired, sleepy) and/or the circumstance "weather" exists (i.e., the weather is cloudy, sunny, rainy).

In a second step, there is collected a stream of real-time continuous measurements from the vehicle sensors.

In a third step, the list of risk patterns is compared against the real-time sensor data in search of patterns in two flows. One flow is a simple flow which is the risk pattern versus real-time sensor data. The second flow is a contextualized flow risk pattern which is increased with associated circumstances rates to compare with real-time sensor data.

As illustrated in the examples above, the risk patterns are a set of values for different elements being sensed that demonstrate a risky behavior. The real time data are the current data obtained by sensors. The system is trying to identify if currently the driver is driving similarly to a risk pattern (or risky behavior)

The simple flow calculates the risk similarity value (not personalized). The second flow is the personal risk value.

In a fourth step, when a risk pattern is identified by the simple flow first, the current circumstances and/or its rates should be updated.

In case of the Risk1 of Example 3 above "Car crash for high speed", the driver can be angry and never reach the risk pattern (100 KM/h), which may mean that the rate for the "driver mood" circumstance, value "angry", should be decreased because the value never makes the driver surpass the Risk 1 Threshold.

Associate current circumstances that are not associated with the risk and assign a minimum circumstance rate. For each current circumstance value increment the circumstance rate associated to the risk. For each not current circumstance value decrement the circumstance rate associated to the risk. The circumstance rate is decreased/increased based on the number of times the circumstance value was present when the risk similarity surpassed the risk threshold. That is, the real-time sensor data matched the pattern as a percentage.

For example, if the driver is angry in 30 out of 100 times when the threshold is surpassed, then "angry" is a relevant factor in this risk by approximately 30%.

In a fifth step, when a risk pattern is identified by the contextualized flow first, the current circumstances rates are fine. Associate current circumstances that are not associated with the risk and assign a minimum rate.

In the case of the Risk1 Example 3 above "Car crash for high speed", If when the driver is driving sleepy, the driver reaches the risk pattern (100 KM/h) but the driver never reaches it when the driver is not angry, this means that the rate for the "driver mood" circumstance, value "angry", is fine because it helps to detect the risk before reaching the 100 KM/h speed when the driver is detected to be tired. If the driver is angry and tired then tired has to be added in the circumstances values that makes the driver surpass the threshold of the risk with the driver's personal risk value.

In a sixth and final step, automatic context modifying actions for the identified risk are executed. If the subsequent context changes minimize risk, the action is prioritized, otherwise, the action is devaluated such that the action's priority for minimizing risk is lowered.

After the training process is complete, a risk evaluation process may begin and is described hereafter.

This process has four phases as explained hereafter.

The first phase is context information gathering for circumstances. This may include identifying the driver and load her/his profile. The profile can contain health information, age and gender. The driver's mood can be obtained by accessing the driver's social network, measuring the driver's pulse and gesture and/or by asking directly. The context information may further include the time of the day, weather information, GPS location and route information (such as planned route, traffic jams, etc.). This context information may also be stored in a history log.

As context continuously changes, the context data should be updated periodically. Updated context information is submitted to the risk evaluation sub-process for evaluation to match risk patterns, calculate the risk similarity value and personal risk value.

The second phase is collecting a stream of real-time continuous measurements from the vehicle sensors. All sensors' data is continuously read and a log is kept of "n" rows and "m" columns (one column by sensor and each column with an identification (ID) that identifies the type of sensor). The n can be configured. The n depends on each risk pattern, and is the number of samples of data in time required to identify a risk pattern. So, n can be configured based on the number of samples required by the risk pattern to check the real time data.

The third phase is risky situation detection which may proceed in the following manner. Risks are obtained from a risk patterns database. These are all possible risks that may pertain to a vehicle. Risks are not created dynamically. The risks have to be loaded into the risk patterns database.

For each selected risk:
Get a list of risk patterns and infer number of rows required. The number of rows has to be previously configured in each risk pattern assuming previous observation of data. In many cases a risk pattern is one line. Each risk pattern is a regular expression. Regular expressions are a technique to match text patterns and is one way to determine if real time data, processed as a string, matched a risk pattern.

Get a list of IDs of required sensors. Each risk has a previous configuration of the data and sensors from which the risk needs data to be evaluated. The order of sensors is important for the next step.

Read the number of rows from the sensors' data collected in the second phase selecting only the required sensors. With the selected sensors' data, create an ordered list where the order of appended column matches the order obtained in previous step.

Match each row of real-time sensors' data with the associated risk pattern.

Contextualize the risk patterns comparison by increasing it with associated circumstances rates. That is, the risk similarity value is personalized with the circumstance value rate by multiplying to result in: circumstance rate*risk similarity value=personalized risk value.

If the risk patterns match and the personalized risk value exceeds a predefined threshold, read and execute context modifying actions. If there is no pattern match, no action is executed, since this means the personalized risk value didn't surpass the threshold.

It may be desirable to insert a configurable delay interval and then this third phase may be repeated.

The fourth phase may include in-process learning.

When a risk pattern is identified the context is analyzed to recalculate the circumstances rates of occurrence. The process is similar to the one in the learning period described above:

First, associate current circumstances that are not associated with the risk assigning a minimum rate.

Then, for each current circumstance value increment the rate associated to the risk.

Finally, for each not current circumstance value decrement the rate associated to the risk.

Figure 2:
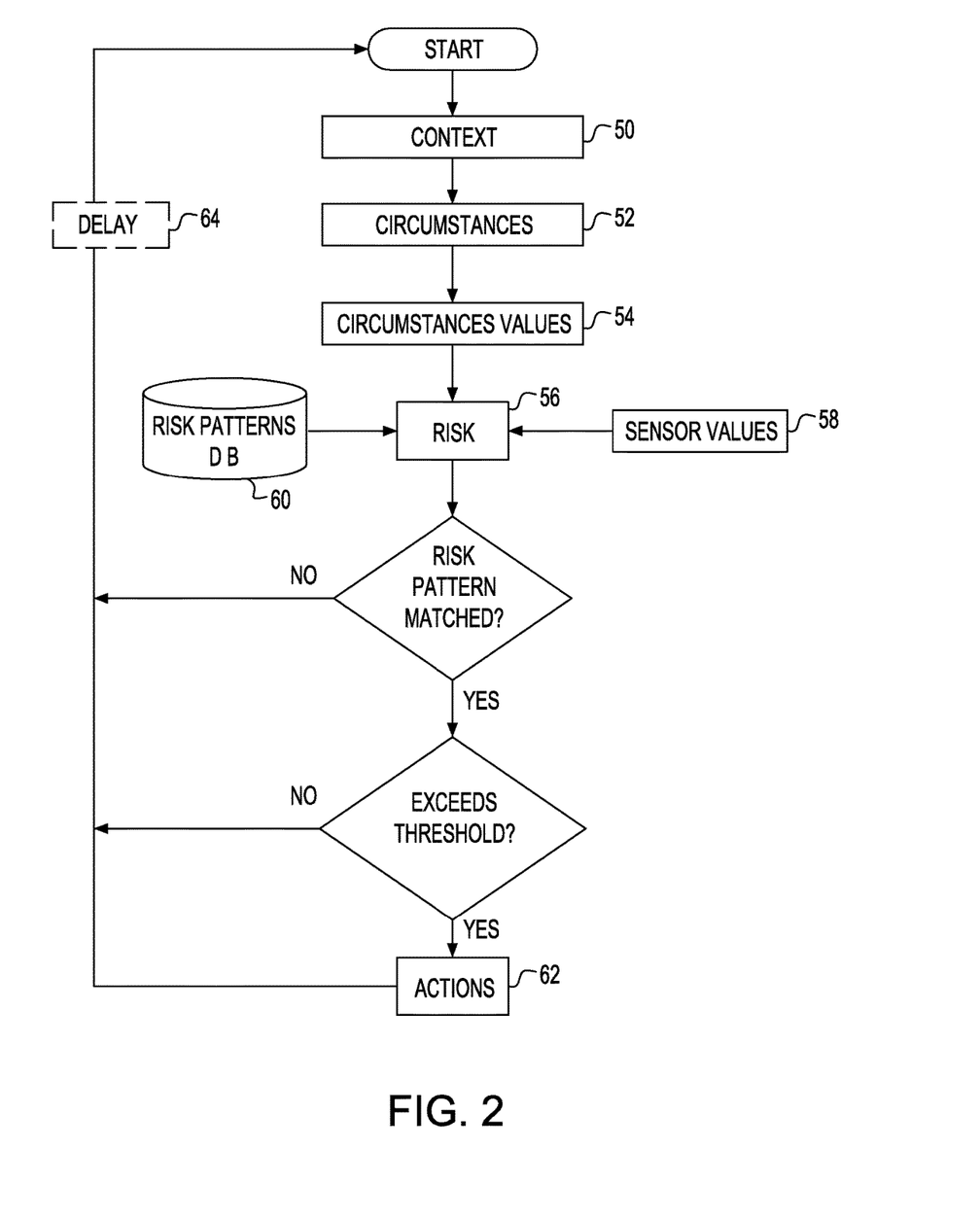
FIG. 2 is a flow chart applicable to the exemplary embodiments of risk analysis.

A summary of an exemplary embodiment for risk evaluation is illustrated in FIG. 2.

Context data is gathered, box 50. Such context data may be, for example, environmental data and personalized context data.

The context data is defined by a configurable set of circumstances, box 52. Circumstances may be, for example, driver mood, weather, location, etc.

Each circumstance has a set of circumstance values which each have a circumstance rate, box 54. For example, driver mood [tired:50%, sleepy: 50%, stressed: 50%].

The risk in box 56 needs to be determined. Sensors are read and placed in an ordered list, box 58, and then compared with stored risk patterns, 60. The risk patterns are contextualized by increasing the risk patterns with the circumstance rates to result in a personalized risk value. The result is the risk.

If the risk pattern is matched and if the personalized risk value exceeds a predefined threshold, the "YES" path is followed, then an appropriate context modifying action(s) may be executed that lowers the personalized risk value below the predefined threshold, box 62. After the context modifying action is executed, the process may be repeated. If there is no risk pattern match, or if the personalized risk value does not exceed the predefined threshold, either of the "NO" paths may be followed and the process proceeds back to the beginning to repeat the process. There may be an optional delay 64 instituted before the process repeats.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A computer-implemented method for improving risk situations for vehicle occupants in a vehicle comprising the steps of;
configuring a set of circumstances where each circumstances is a condition of a time, a place or a manner that accompanies or influences an event or a person;
defining a set of values for each circumstance where each value has a rate;
collecting context information for the circumstances, values and rates;
collecting by vehicle sensors, real-time sensor measurements pertaining to a vehicle, a driver and vehicle occupants;
retrieving risk patterns from a risk pattern database;
matching the sensor measurements to the risk patterns to find a matching risk pattern having a risk similarity value;
contextualizing the matching risk pattern by increasing the risk similarity value to result in a personalized risk value;
comparing the personalized risk value to a threshold; and
autonomously executing by the vehicle a context modifying action to lower the personalized risk value when the personalized risk value exceeds a predefined threshold wherein the context modifying action is a personalized action performed by the vehicle to take over and autonomously execute the personalized action with respect to the vehicle occupants or the vehicle that decreases the personalized risk value below the predefined threshold.

2. The computer-implemented method of claim 1 where when the personalized risk value does not exceed the predefined threshold, repeating the process starting from configuring a set of circumstances.

3. The computer-implemented method of claim 1 wherein when matching the sensor measurements to the risk patterns does not find a matching risk pattern, repeating the process starting from configuring a set of circumstances.

4. The computer-implemented method of claim 1 wherein collecting context information includes collecting one or more of identifying the driver, loading a profile of the driver, obtaining a mood of the driver, time of day weather information, GPS location and vehicle route information.

5. The computer-implemented method of claim 1 wherein collecting by vehicle sensors including continuously collecting by vehicle sensors the real-time sensor measurements.

6. The computer-implemented method of claim 1 further comprising a training process comprising:
predefining a default context information for the circumstances, values and rates;
predefining a default set of patterns for sensor readouts that represent default risk patterns;
adjusting the rates using the collected context information for the circumstances, values and rates and the collected real-time sensor measurements.

7. The computer-implemented method of claim 1 wherein the context modifying action comprises a context modifier changing environmental variables to reduce the risk below the predefined threshold risk.

8. A vehicle system for improving risk situations for vehicle occupants in a vehicle comprising;
a computer readable storage medium that stores instructions; and
a processor that executes the instructions to perform the following functions:
configure a set of circumstances where each circumstances is a condition of a time, a place or a manner that accompanies or influences an event or a person;
define a set of values for each circumstance where each value has a rate;
collect context information for the circumstances, values and rates;
collect by vehicle sensors, real-time sensor measurements pertaining to a vehicle, a driver and vehicle occupants;
retrieve risk patterns from a risk pattern database;
match the sensor measurements to the risk patterns to find a matching risk pattern having a risk similarity value;
contextualize the matching risk pattern by increasing the risk similarity value to result in a personalized risk value;
compare the personalized risk value to a threshold; and
autonomously execute by the vehicle a context modifying action to lower the personalized risk value when the personalized risk value exceeds a predefined threshold wherein the context modifying action is a personalized action performed by the vehicle to take over and autonomously execute the personalized action with respect to the vehicle occupants or the vehicle that decreases the personalized risk value below the predefined threshold.

9. The system of claim 8 where when the personalized risk value does not exceed the predefined threshold, repeat starting from configure a set of circumstances.

10. The system of claim 8 wherein when match the sensor measurements to the risk patterns does not find a matching risk pattern, repeat starting from configure a set of circumstances.

11. The system of claim 8 wherein collect context information includes collect one or more of identifying the driver, loading a profile of the driver, obtaining a mood of the driver, time of day weather information, GPS location and vehicle route information.

12. The system of claim 8 wherein collect by vehicle sensors including continuously collect by vehicle sensors the real-time sensor measurements.

13. The system of claim 8 further wherein the processor that executes the instructions to perform the following additional functions comprising a training process comprising:
predefine a default context information for the circumstances, values and rates;
predefine a default set of patterns for sensor readouts that represent default risk patterns;
adjust the rates using the collected context information for the circumstances, values and rates and the collected real-time sensor measurements.

14. The system of claim 8 wherein the context modifying action comprises a context modifier changing environmental variables to reduce the risk below the predefined threshold risk.

15. A computer program product for improving risk situations for vehicle occupants in a vehicle, the computer program product comprising a non-transitory computer readable storage medium having program instructions embodied therewith, the program instructions executable by a processor to cause the processor to perform a method comprising;
configuring a set of circumstances where each circumstances is a condition of a time, a place or a manner that accompanies or influences an event or a person;
defining a set of values for each circumstance where each value has a rate;

collecting context information for the circumstances, values and rates;
collecting by vehicle sensors, real-time sensor measurements pertaining to a vehicle, a driver and vehicle occupants;
retrieving risk patterns from a risk pattern database;
matching the sensor measurements to the risk patterns to find a matching risk pattern having a risk similarity value;
contextualizing the matching risk pattern by increasing the risk similarity value to result in a personalized risk value;
comparing the personalized risk value to a threshold; and
autonomously executing by the vehicle a context modifying action to lower the personalized risk value when the personalized risk value exceeds a predefined threshold wherein the context modifying action is a personalized action performed by the vehicle to take over and autonomously execute the personalized action with respect to the vehicle occupants or the vehicle that decreases the personalized risk value below the predefined threshold.

16. The computer program product of claim 15 where when the personalized risk value does not exceed the predefined threshold, repeating the process starting from configuring a set of circumstances.

17. The computer program product of claim 15 wherein when matching the sensor measurements to the risk patterns does not find a matching risk pattern, repeating the process starting from configuring a set of circumstances.

18. The computer program product of claim 15 wherein collecting context information includes collecting one or more of identifying the driver, loading a profile of the driver, obtaining a mood of the driver, time of day weather information, GPS location and vehicle route information.

19. The computer program product of claim 15 further comprising a training process comprising:
predefining a default context information for the circumstances, values and rates;
predefining a default set of patterns for sensor readouts that represent default risk patterns;
adjusting the rates using the collected context information for the circumstances, values and rates and the collected real-time sensor measurements.

20. The computer program product of claim 15 wherein the context modifying action comprises a context modifier changing environmental variables to reduce the risk below the predefined threshold risk.

* * * * *

UNITED STATES PATENT AND TRADEMARK OFFICE
CERTIFICATE OF CORRECTION

PATENT NO. : 10,274,338 B2  
APPLICATION NO. : 15/375136  
DATED : April 30, 2019  
INVENTOR(S) : Boss et al.

Page 1 of 1

It is certified that error appears in the above-identified patent and that said Letters Patent is hereby corrected as shown below:

On the Title Page

Item [72] insert:  
--Ivonne Rocio Cuervo Fajardo--

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*